United States Patent [19]

Then

[11] Patent Number: 4,913,514
[45] Date of Patent: Apr. 3, 1990

[54] FIBER OPTIC CONNECTOR

[75] Inventor: Joseph L. Then, Rockville, Md.

[73] Assignee: Advanced Optical Systems, Rockville, Md.

[21] Appl. No.: 274,440

[22] Filed: Nov. 22, 1988

[51] Int. Cl.⁴ .............................................. G02B 6/38
[52] U.S. Cl. .............................. 350/96.21; 350/96.18
[58] Field of Search .............. 350/96.20, 96.21, 96.22, 350/96.18

[56] References Cited

U.S. PATENT DOCUMENTS 4,787,700  11/1988  Yin .................................... 350/96.21

FOREIGN PATENT DOCUMENTS 54-136346  10/1979  Japan ................................ 350/96.21
58-202402  11/1983  Japan ................................ 350/96.21
61-57911    3/1986  Japan ................................ 350/96.21

OTHER PUBLICATIONS

Article "Ceramic Capillary Connectors" Oct. 1984, Photonics Spectra, pp. 65-70.
Article "Connectors: Trends" Jun. 1987 Laser Focus/Electro-Optics, pp. 130-146.

Primary Examiner—Frank Gonzalez
Attorney, Agent, or Firm—Lowe, Price, LeBlanc, Becker & Shur

[57] ABSTRACT

Disclosed is a hermaphroditic fiber optic connector having provision for an automatic protective covering for the fiber optic for covering the end at any time that the connector is demated. In one embodiment the connector provides precise positioning of parallel disposed fiber end surfaces with the angle of the end surface being preferably greater than the sum of the Brewster Angle and the Numerical Aperture (NA) of the fiber to assure reflectionless high efficiency transmission.

22 Claims, 6 Drawing Sheets

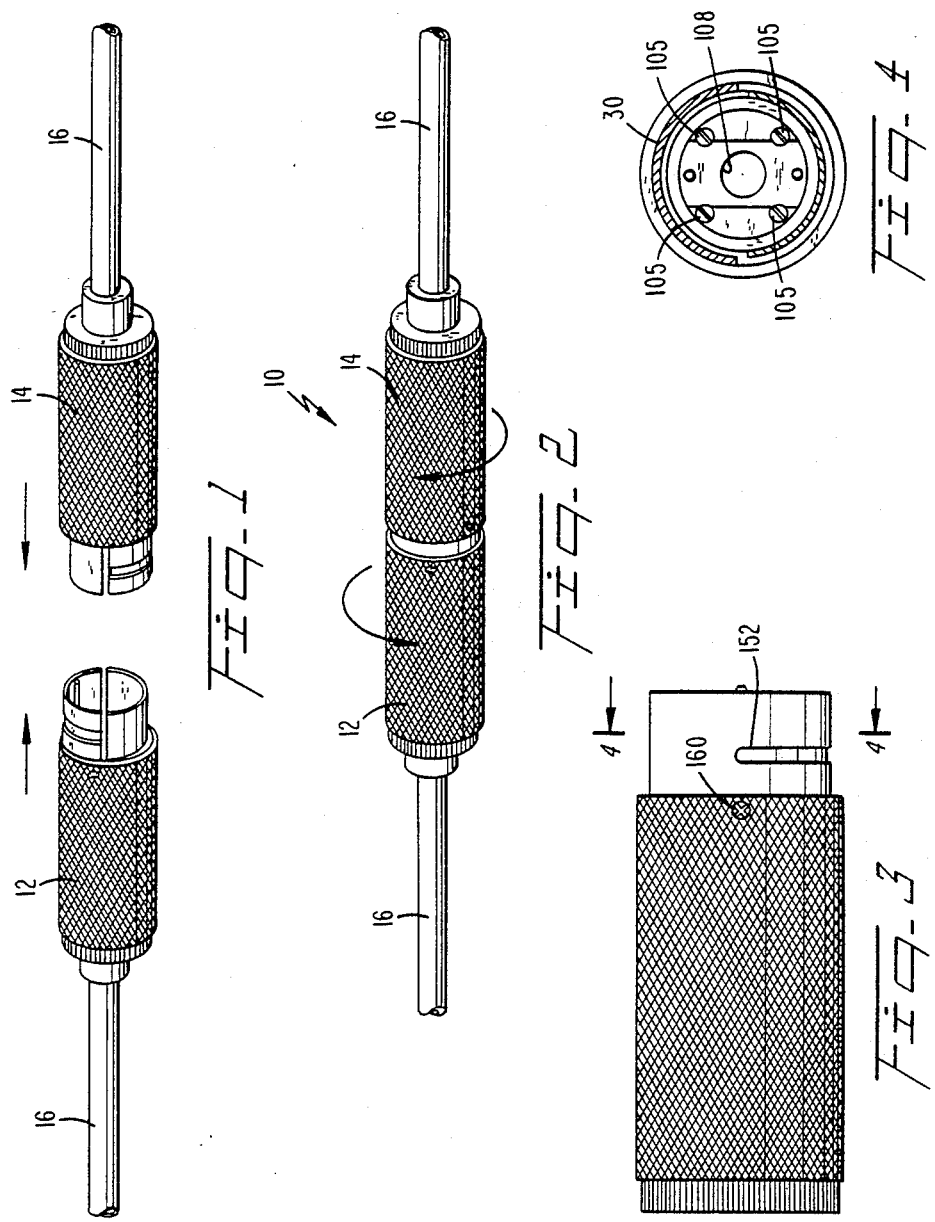

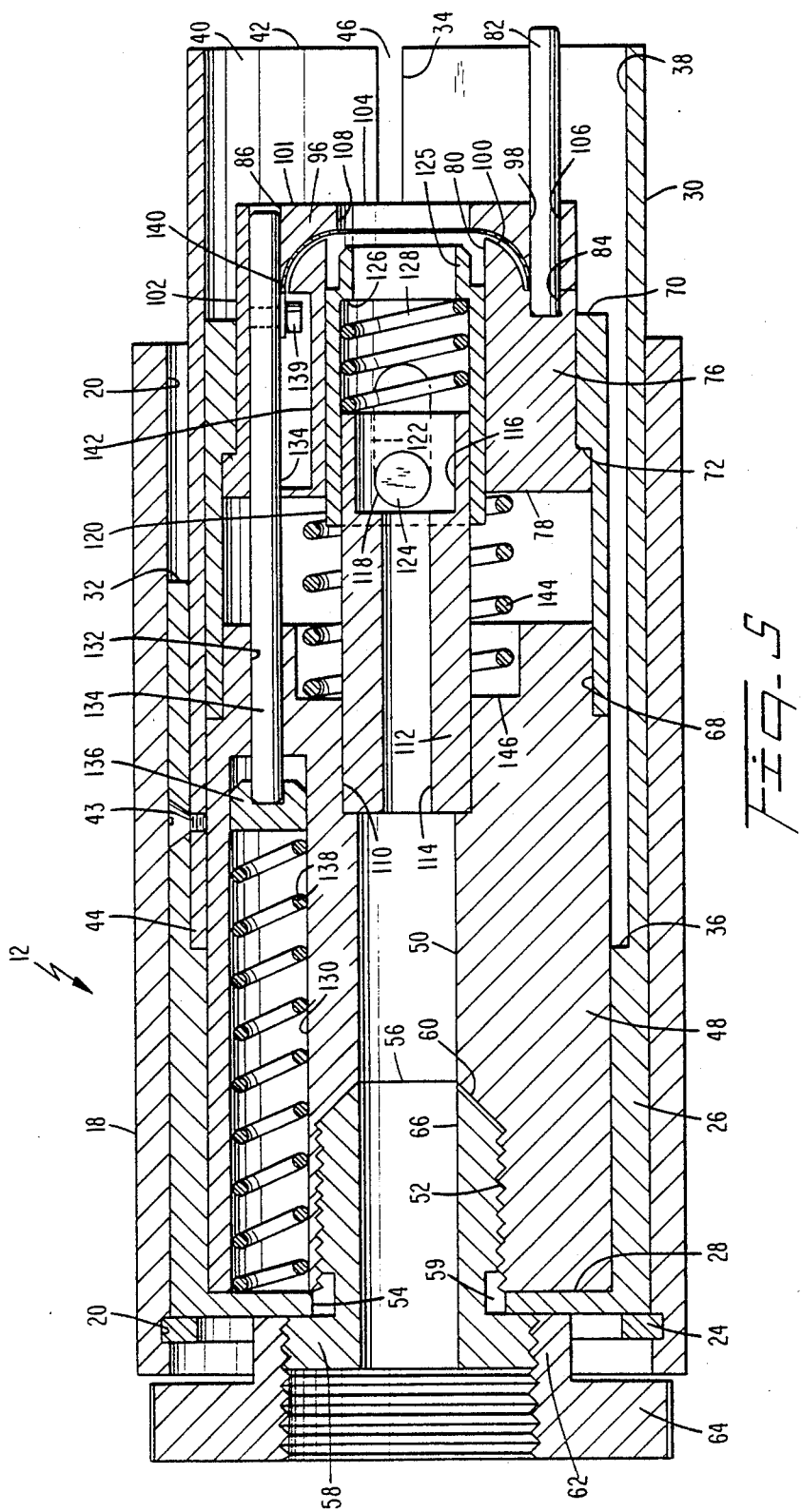

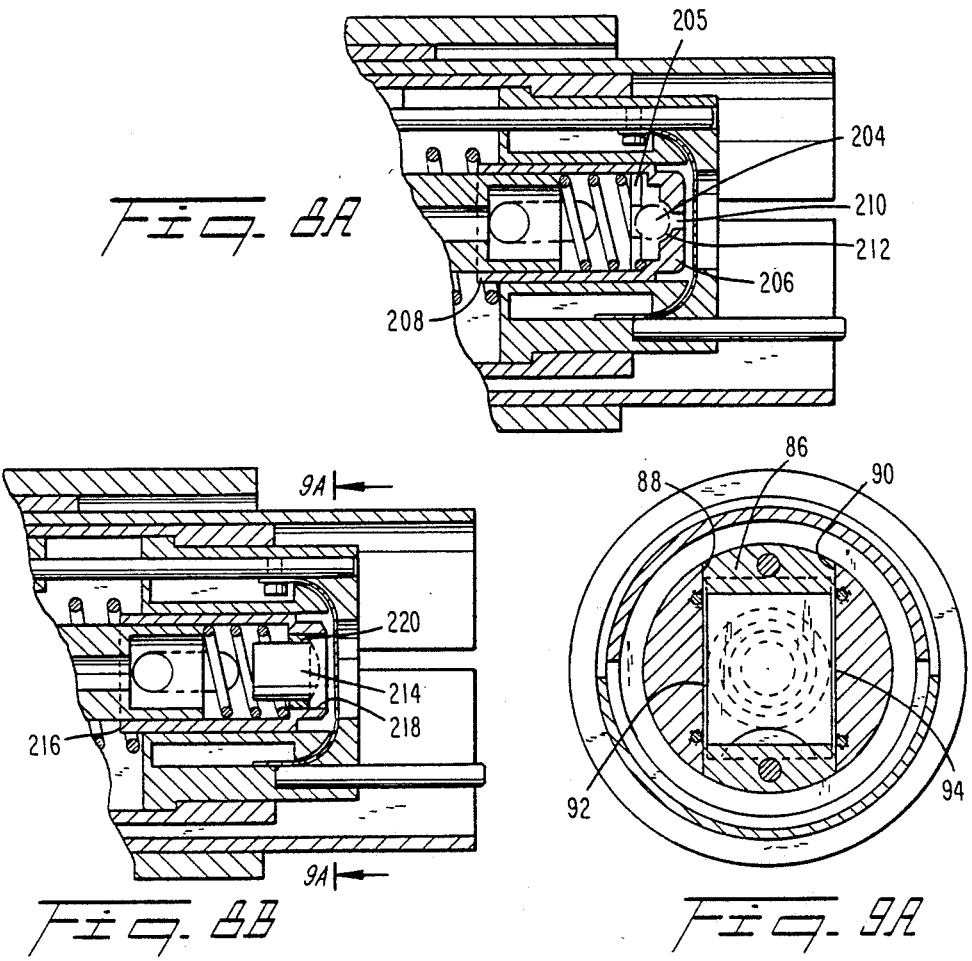
Fig. 8A
Fig. 8B
Fig. 9A
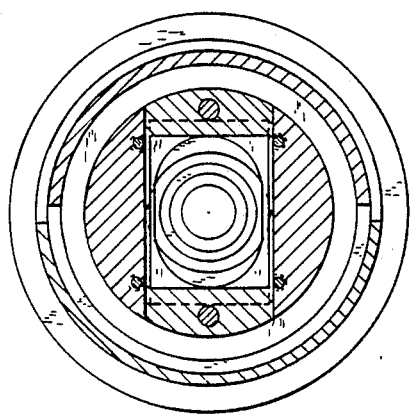
Fig. 9B

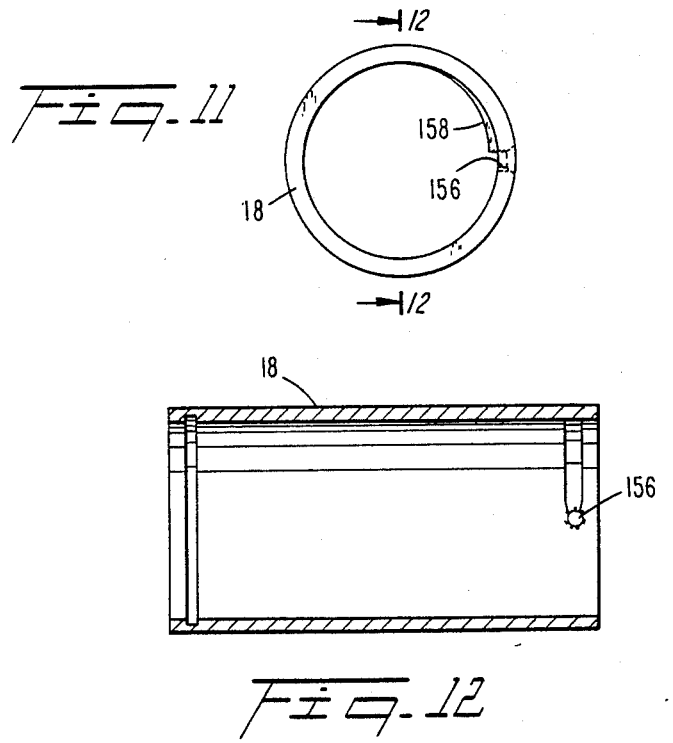
Fig. 11
Fig. 12
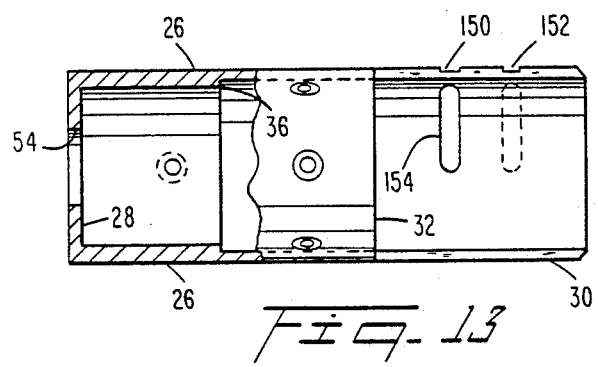
Fig. 13
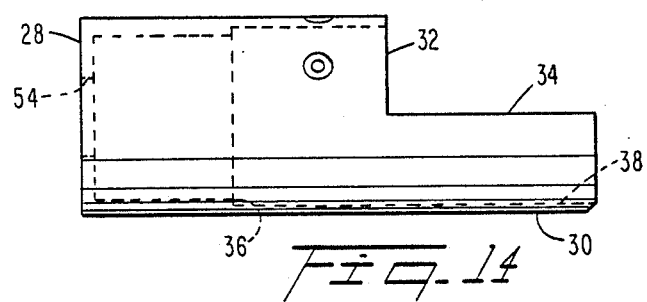
Fig. 14

FIBER OPTIC CONNECTOR

TECHNICAL FIELD

This invention is directed to fiber optic connectors and more particularly to a hermaphroditic fiber optic connector.

BACKGROUND ART

The fundamental purpose of a fiber optic connector is the non-permanent connection of an optical fiber to another optical fiber, to an active device such as an emitter or detector, or to a passive device such as a branching device or attenuator. A connector terminates the fiber such that interconnection is facilitated. The basic purpose of the connector is to position two optical fiber cores with a very high degree of mechanical precision. Fiber optic interconnection must reliably and repeatably align components with micrometer level or even submicrometer level precision and yet also achieve the economies of mass production.

The objective of a connector system is maximum efficiency in power coupling across the joint, for example, from fiber core to fiber core. Of the parameters describing an optical joint using connectors greatest attention is usually paid to insertion loss. The contributions to joint loss are both intrinsic and extrinsic to the fiber or fibers. Fiber intrinsic losses stem from differences in such parameters as core or mode-field diameters or numerical apertures between the two fibers being joined. Prior connectors have been unable to alleviate most intrinsic losses. Extrinsic losses, on the other hand, result from the effects of the optical quality of the fiber's end, index matching, cleanliness, and various forms of misalignment. The history of fiber optic connector technology revolves around the understanding and minimization of these extrinsic effects.

The control of optical fiber connector losses is based on control of three mechanical conditions of the mated fiber ends: lateral displacement, fiber end separation and angular alignment. The largest contributor to connector loss is the lateral displacement of the fiber cores. The second largest contributor to conductor loss is end separation of the fiber cores. Theoretically the most desirable situation is to have the connector end faces just touching. In practice precision plastic or metal ferrule components do not always allow this condition to be reliably implemented. Least critical in its contribution to optical loss is the angular alignment of the fiber ends.

In addition to providing an acceptably low insertion loss a connector system must also provide good repeatability of this loss over many disconnect/remate cycles. In certain applications repeatability is even more important than nominal loss. Additionally, the loss must not be overly sensitive to temperature, vibration or cable tension.

Fiber optic connectors can be generally grouped into three major classes: "bare-fiber" connectors, ferrule connectors (straight and conical), and expanded-beam connectors. "Bare-fiber" connectors are essentially temporary mechanical splices and have not proven commercially viable. Ferrule connectors, by comparison, protect the fiber by encasing it in a cylinder or cone many times its diameter. If the fiber's core can be positioned accurately on the centerline of the ferrule, the jointing problem is simplified to aligning two larger objects, that is, the ferrules instead of the fibers. The mechanical problems of ferrule connector schemes therefore lie in the concentricity of fiber core to ferrule outer surface and concentricity of one ferrule to the other. Both are related to diameter tolerances. Ferrule connector designs have been overwhelmingly cylindrical. Perhaps the best known of these is the so-called SMA style. However a conical ferrule is in widespread use in telecommunications and elsewhere. With a tapered design no sliding fits are needed and diametral tolerances are alleviated. Since two mating conical ferrules are joined in an interconnecting bushing with a biconical internal shape the system is called "biconic."

Expanded beam connectors columnate the rays of the mating fibers, creating virtual "core" diameters much larger than those of the fibers themselves. This approach greatly diminishes the effects of radial misalignment and end face contamination. On the other hand, they are more sensitive to angular misalignment and, as a result, trade one set of problems for another.

The SMA style connector finds large scale usage in data communications environments. The AT&T ST connector also is in significant use in the data communications field. Another SMA style connector in growing use is the Amphenol ST type product using ultra precise cast ceramic ferrules. For connectors to be used in military and aerospace applications reliability and standardization are the key features. The SMA style single channel connector has been popular and is now described in a MIL standard.

Summaries of the background state of the art are found in "Ceramic Capillary Connectors", "Photonics Spectra" October 1984, pages 65–70 and "Connectors: Trends", Laser Focus/Electro Optics June 1987, pages 130–146.

DISCLOSURE OF THE INVENTION

The present invention provides an improved fiber optic connector which accomplishes configuration and disposition of the optical fiber optic ends to eliminate reflections, a connector mechanism design capable of mating with itself (hermaphrodicity), and the provision of an automatic protective covering for the fiber optic at any time that the connector is demated.

Reflectionless transmission is accomplished by the use of commercially available precision ceramic (or other suitable material) ferrules which are polished to eliminate reflections. The precision ceramic ferrules are shaped to provide extremely low loss by maintaining accurate axial and spatial positioning of the two fiber ends. These ceramic ferrules are mounted in a second sleeve which may be ceramic or other suitable material that is specially configured to allow mating with itself. This two-part assembly is mounted in a housing which is hermaphroditic and provides protection of the fiber end-face when the connector is demated.

To allow reflectionless transmission through the connector, the end-face of the ceramic ferrule in which the optical fiber is mounted is polished at an angle such that reflections from the polished fiber face are directed out of the fiber, as shown in FIG. 6A. This polish angle is well known to those familiar with the art as the "Brewster Angle". According to the instant invention the polish angle is greater than the sum of the Brewster Angle and the Numerical Aperture (NA) of the fiber to assure reflectionless transmission through the connector. This angle is indicated as $\alpha$ in FIG. 6. Additionally, to minimize loss through the connector, the two polished ceramic ferrules are "registered" to assure the two end-face planes are parallel. This is also illustrated in FIG. 6A. An unregistered and undesirable disposition is illustrated in FIG. 6B.

In another arrangement the angled termination is replaced with a spherical or ball lens which permits the interaction of the beam in the connecting process. Since the hermaphroditic connector is axially aligned, the spherical lenses automatically align with each other with a minimal loss. The mating of the hermaphroditic connectors with the ball lenses allows the input/output of a collimated beam. The beam is transferred from one focal point to the other. There is an estimated 95% (0.2 dB insertion loss) efficiency of this system. The lens preferably has an anti-reflection coating. A general embodiment of a ball lens arrangement according to the invention is illustrated in FIG. 8A.

Still another arrangement employs an aspheric lens mated to the ceramic (or other appropriate material) ferrule. Such a lens is sealed to the ferrule (or in the case when a glass is used as a ferrule the lens would be integrated) on insertion to the hermaphroditic mechanical shell portion of the connector. It is well established in the optical field that a correctly formed aspheric lens surface exactly cancels the spherical aberrations. Such a system is described as aplanatic. More energy can be concentrated into a small area with the aspheric surface directing marginal rays on target. In the connector of the invention such a lens offers high efficiency. Other lens systems may be used with various degrees of efficiency when incorporated in the design. Such lenses may be formed of various types of glass or plastic or combinations of the two. FIG. 8B illustrates a general embodiment of a rod type aspheric lens.

To allow a connector to mate with any other connector according to the preferred embodiment of the invention both the connector shell (housing) and the fiber mating mechanism are hermaphroditic. To allow the fiber mating mechanism to be hermaphroditic the cylindrical sleeve in which the ceramic ferrule (with the angularly polished end-face) is mounted, is configured such that it is mateable with itself (hermaphroditic). In a preferred implementation the end configuration is three-tined, with each tine of the same dimension as the space between the tines, such that hermaphrodicity is achieved. Since there are three tines, the ceramic ferrule holding the fiber must be such that the angularly polished face is directed towards either a tine or toward a space between two tines to allow hermaphroditic connection. In one preferred implementation, the angularly polished fiber end is directed towards a tine, such that two connected fiber ends (mounted in their respective ceramic ferrules) have their polished end-face planes parallel, as shown in FIGS. 6A and 7. The arrows in FIG. 7 are normal to the planes of the fiber ends and intersect the axes of the fiber ends. Other implementations of this hermaphroditic interface could use differing numbers of tines, or other cut configurations without changing the concept of the invention.

A third feature of the invention is the provision of an automatic end-face protection of the fiber in the connector demated state. A serious problem of fiber connectors in adverse environments is contamination of the fiber end-face with dust particles when demated. The use of "dust caps" has conventionally been used to alleviate the problem, however, unless the dust cap is either protected when in the demated condition, or thoroughly cleaned before each use, dust contamination (or other contaminants, such as lint, oil, dirt, etc.) on the inside of the dust cap will be transferred to the fiber end-face. When the connectors are subsequently mated, the dust particles then scratch (or obscure) the fiber end-face and optical transmissivity is degraded. In the instant invention, the provision of protection to the fiber end-face is automatic on demating the connector. One embodiment of a preferred form of such a mechanism is shown in FIGS. 8 and 9.

BRIEF DESCRIPTION OF DRAWINGS

FIG. 1 is a perspective view showing a connector according to the invention in a demated or separated form prior to connection;

FIG. 2 is a perspective view of a connector according to the invention in a mated form;

FIG. 3 is a vertical elevation of a single connector housing;

FIG. 4 is a vertical cross-section taken of FIG. 3 on the line 4—4;

FIG. 5 is a vertical section through the centerline of one embodiment of connector constructed according to the invention;

FIG. 8A is a partial vertical section on the centerline of a connector constructed according to one embodiment of the invention utilizing a spherical or ball lens;

FIG. 8B is a partial vertical section on the centerline of a connector constructed according to another embodiment of the invention utilizing an aspheric lens;

FIG. 9A is a vertical section through the connector of FIG. 8B taken on the line 9A—9A and showing the lens closure or shutter in its closed position.

FIG. 9B is a vertical section of the connector of FIG. 8B along the line 9A—9A showing the lens shutter in its retracted or open position;

FIG. 11 is a vertical end view of the outer housing illustrating the locking key;

FIG. 12 is a vertical section through the outer housing taken along the line 12—12 of FIG. 11;

FIG. 13 is a plan view of the outer shell partially in section; and

FIG. 14 is a side view of the outer shell.

BEST MODE FOR CARRYING OUT THE INVENTION

Figure 6A:
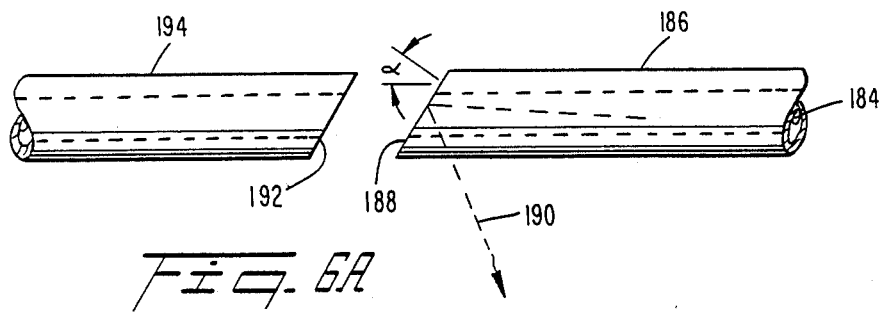
FIG. 6A is a side elevation of two polished ceramic ferrules in registered disposition.
Figure 6B:
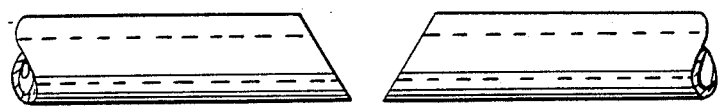
FIG. 6B is a side elevation of two such ferrules in an unregistered disposition.

Referring to FIGS. 1 and 2 there is shown a connector 10 comprised of connector halves 12 and 14. The connector halves are shown separated in FIG. 1 for coupling by axial movement towards each other followed by locking rotation as illustrated by the arrows in FIGS. 1 and 2. Each connector half carries the end of a fiber optic cable 16.

Referring to FIG. 5 there is shown a vertical cross-section through the connector half 12 which is illustrated in side view in FIG. 3. The connector half 12 comprises a cylindrical outer housing 18 which is preferably knurled on its outer surface. The inner surface 20 of outer housing 18 is provided at its left end in FIG. 5 with a peripheral key-way or groove 22 which receives a removable split ring type retaining ring 24. Mounted within the outer housing 18 is a cylindrical outer shell 26 having an apertured end wall 28 (see FIGS. 13 and 14). The outer end surface of the end wall 28 is in loose engagement with the retaining ring 24. The opposite end of the outer shell 26 comprises a half cylinder indicated at 30. The upper half of the outer shell 26 is cut away at the vertical edge 32 in FIGS. 5 and 14 down to the horizontal edges 34 which extend to the right-most end of the outer shell 26. FIG. 4 illustrates a cross-section through the half cylinder end 30 in a position inverted from that seen in FIG. 5.

Outer shell 26 has a counter bore 36 cut into its right end to define the inner diameter 38 of the cylinder half 30. Mounted within this counter bore is an inner shell 40 in the general form of slightly less than a cylinder half. The inner shell has an outer diameter equal to the inner diameter 38 of the counter bore 36 in outer shell 26. The inner shell 40 referred to as a cylinder half actually is less than a half cylinder and preferably extends approximately 95° downward on either side of the vertical or a total of 190°.

The cylinder half or inner shell 40 is disposed within the counter bore of outer shell 26 in a diametrically opposite disposition to the cylinder half 30. The inner shell or cylinder half 40 in FIG. 5 extends axially from its right end 42 to its left end 44 which abuts the bottom of the upper half of the counter bore 36 in FIG. 5. The inner shell 40 is thus of a lesser diameter than the outer shell half cylinder 30. The outer diameter of the inner shell half cylinder 40 is substantially equal to the inner diameter of the outer shell half cylinder 30. The peripheral extent of the inner shell half cylinder 40 is such as to define diametrically opposed slots 46 between the coaxially extending edges of the outer and inner shells 30 and 40.

Mounted within outer shell 26 is a cylindrical connector base 48 having an axial center bore 50. The left end of the bore 50 is counter-bored and threaded at 52 such that the diameter of the threaded counter bore 52 is substantially the same as the diameter of an axial opening 54 in the base 28 of the outer shell 26. The connector base 48 is held within the outer shell 26 by means of a threaded plug or jam screw 56 having an enlarged head 58. A cut away portion 59 is disposed between the jam screw head 58 and its threaded portion. The head 58 engages the outer surface of the end wall 28 of outer shell 26. The inner end of the plug 56 is tapered as indicated at 60 to mate with a similarly shaped taper in the counter bore in the connector base 48. Screw threaded tightening of the plug 56 in the threaded counter bore 52 of the connector base 48 secures the connector base 48 within outer shell 26. The outer peripheral surface of the head 58 of plug 56 is threaded to screw-threadedly engage the reduced diameter inner end 62 of a lock nut or cap 64. The plug 56 carries a central bore 66 of the same diameter as the bore 50 in the connector base 48.

The right end of the connector base 48 is provided with a reduced diameter portion 68 upon which is mounted a cylindrical retainer 70. The retainer 70 is counter-bored at 72 to provide a lesser diameter right end and larger diameter left end as seen in FIG. 5. The inner shell or half cylinder 40 is secured to the outer shell 26 by means of spaced radially extending screws such as the screw indicated at 43 in FIG. 5. The retainer 70 is likewise attached to the connector base 48 by a similar series of radially extending screws (not shown).

Received within the retainer 70 is a cylindrical guide block 76 having an end flange 78 with its under surface abutting against the counter bore edge 72. Guide block 76 is provided with a central axial bore 80 extending therethrough. A shutter drive pin 82 is mounted by force fit in a suitable hole 84 in the retainer end. The upper surface of the guide block 76 is slotted in the direction of its axis to form a chordal surface 86 and opposed side edges 88 and 90 as seen in FIGS. 5 and 9A. The end face of the guide block 76 is provided with a vertical slot of equal width having edges 92 and 94 extending vertically as shown in FIG. 9A. At the intersection of the horizontal and vertical slots the retainer is beveled or curvate as shown at 96 in FIG. 5. A shorter bottom slot is cut in the lower surface of the guide block 76 to define a relatively short chordal surface 98. The intersection of this short lower slot and the vertical slot is beveled as shown at 100.

Referring to FIG. 5 a generally inverted "L" shaped shutter guide 101 has a horizontal portion 102 thereof received within the upper horizontal slot in the guide block 76. Depending from the horizontal portion 102 is a vertical plate 104 which is received within the vertical slot in the guide block. The right-most surface of the vertical plate 104 is planar as seen in FIG. 5. The left-most or inner surface of the vertical plate 104 is beveled at the top and bottom thereof to face the beveled surfaces 96 and 100 on the retainer in a spaced fashion. These spaced surfaces form a guide-way for a shutter presently to be described. The shutter drive pin 82 mounted in guide block 76 extends through an aperture 106 in the vertical plate 104. A center opening 108 is provided in the vertical plate 104 concentric with but of smaller diameter than the bore 80 in guide block 76. The vertical plate 104 is fastened to the guide block 76 by means of screws 105 best seen in FIG. 4.

Mounted within the connector base 48 in a bore 110 is a cylindrical sleeve guide 112 having a center bore 114. The sleeve guide is counter-bored at its right-most end at 116 for a purpose presently to be described. Diametrically opposed threaded openings are disposed in the sleeve guide at opposite sides of the counter bore 116 as shown at 118. Slidably mounted on sleeve guide 112 is a cylindrical sleeve 120. The sleeve 120 is provided with opposed longitudinally extending diametrically opposite slots 122 of a width to slidably receive short screws 124 extending outwardly from each of the threaded openings 118 in the sleeve guide 112. The sleeve 120 is thus mounted on the sleeve guide 112 for slidable axial movement the length of the slot 122. The end of the sleeve 120 has a reduced diameter portion 125 forming an internal shoulder 126. A coil spring 128 biases the sleeve to the right in FIG. 5.

Formed within the upper half of the connector base 48 in FIG. 5 is an axially extending upper bore 130 and smaller bore 132. The smaller bore 132 extends to the right through the right-most end of the connector base 48. A shutter drive pin 134 extends slidably through the bore 132 and terminates at its left-most end in a plug 136 slidably received in the bore 130. A coil spring 138 in bore 130 biases the plug 136 and shutter drive pin 134 outwardly or to the right as seen in FIG. 5. Near the right end of shutter drive pin 134 there is provided a threaded aperture which receives a mounting screw 139 which fastens a strip-like shutter 140 to the shutter drive pin 134. The shutter 140 may be formed by way of example of metalized Mylar. In the closed position shown in FIGS. 4, 5 and 9A the shutter extends over the upper bevel 96, across the bores 108 and 124 and over the lower bevel 100 to effectively close the opening in the connector in the demated condition illustrated in FIGS. 4, 5 and 9A. When the shutter pin 134 is moved to the left in FIG. 5 against the compression of coil spring 138 the shutter 140 is drawn upwardly to expose the bore 124. A slot 142 is provided in the chordal surface 86 formed by the slot in the upper surface of the guide block 76 to permit movement of the screw 139 and the attached shutter 140.

A coil spring 144 is provided around the cylindrical sleeve guide 112 and has its left end received in the counter bore 146 in connector base 48. The other end of the coil spring 144 bears against the left-most end of the guide block 76 to urge its end flange 78 into engagement with the abutment 72 in retainer 70.

Figure 10:
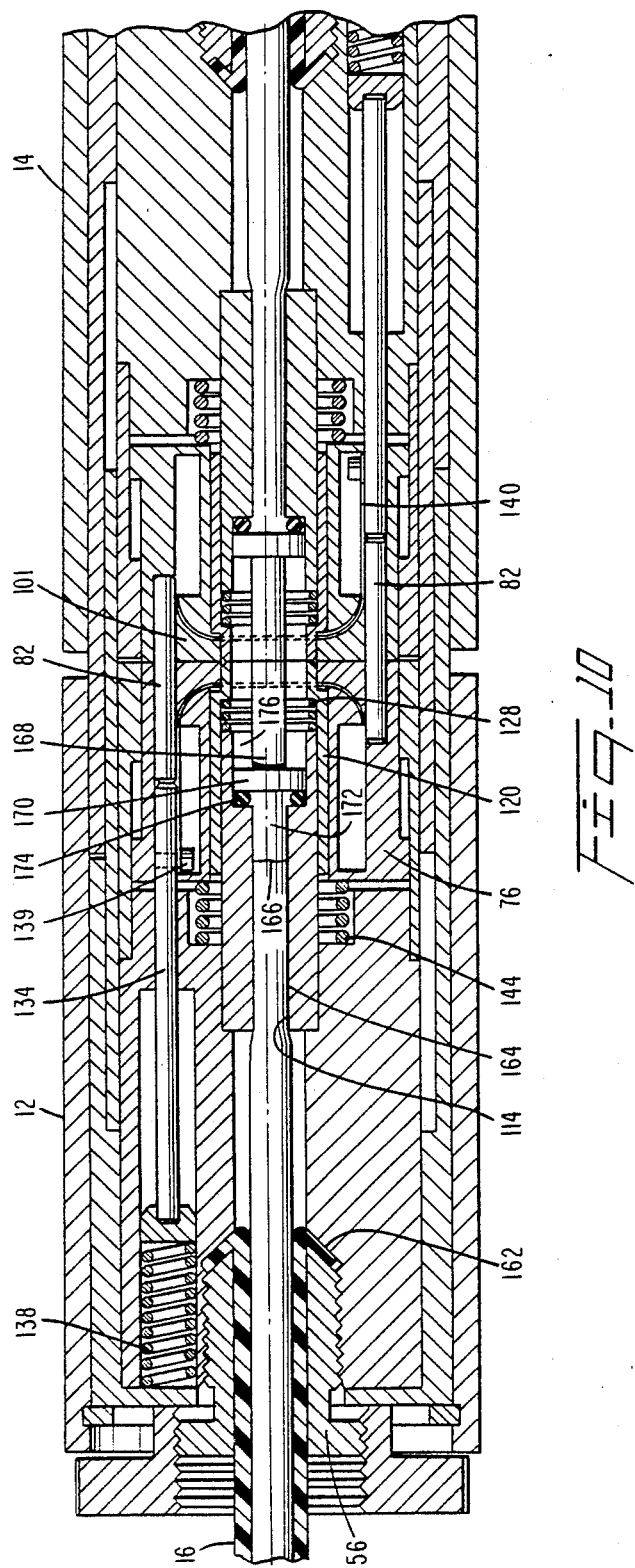
FIG. 10 is a vertical section through a connector constructed according to the invention on the centerline thereof showing the connector in a mated condition.

Two connectors of the type illustrated in FIG. 5 are shown in mated condition in FIG. 10. Each of the said connectors is of the same construction to form a hermaphroditic connection. In the position illustrated in FIG. 10 it will be seen that the end surfaces of the sleeves 120, guide blocks 76, and shutter guides 101 are in engagement to compress the coil springs 128 and 144. Similarly pins 82 depress shutter drive pins 134 to compress springs 138 and move the shutter fastener screws 139 and shutter assemblies to withdraw the shutters 140.

Referring to FIGS. 13 and 14, the half cylinder portion 30 of each outer shell 26 has cut into its external surface a pair of spaced parallel peripheral grooves 150 and 152. These grooves extend an angular distance of approximately 90°. The inward groove 150 has cut therethrough a slot 154 extending over an angular distance of approximately 60°.

Referring to FIGS. 11 and 12, the outer housing 18 is provided with a small threaded opening 156 extending radially into the housing at the right end as seen in FIG. 12. Referring to FIG. 11 a ramp 158 is formed from the position of the aperture 156 extending to the vertical as seen in FIG. 11. The ramp is of increasing height commencing at zero at the vertical and increasing to its maximum approximately 27° before reaching the opening 156 and maintaining its maximum height for the last 27°. The height of the ramp at its maximum is slightly less than the depth of the grooves 150 and 152 but sufficiently high as to lock into such grooves.

When the outer housing 18 is assembled to the outer shell 26 as shown for example in FIG. 5, the housing 18 is movably held on the outer shell 26 by engagement of the split ring 24 with the end of the outer shell at one end and by engagement of a screw 160 (FIG. 3) extending through the opening 156 in the housing into the slot 154 in the outer shell 26. The assembly is such as to permit approximately 60° rotational movement between the outer housing 18 and outer shell 26. When the connector halves are mated as illustrated in FIGS. 2 and 10 the connector halves are locked into position by rotational movement of the respective outer housings 18 so that the internal keys 158 move into the grooves 152 to lock the connector halves into their mated locked position against the compression of the various coil springs 128, 138 and 144.

Referring to the embodiment of the invention illustrated in FIG. 10 it is seen that an optical cable 16 enters the connector half 12 through the jam screw or plug 56. The cladding is stripped away and secured between the beveled edges of the plug and connector base as illustrated at 162. The core 164 continues on into the aperture 114 in sleeve guide 112 and terminates at 166. A ceramic ferrule 168 is mounted in a metallic terminating bushing 170 received within the bore 116 in sleeve guide 112. The bushing 170 has a reduced diameter portion 172 extending into the bore 114 in sleeve guide 112. The bushing 170 is held in position between an O-ring 174 and bushing 176 which may be secured by epoxy resin. The connector half 14 constitutes a mirror image construction of that shown and described in detail with respect to the connector half 12. Thus each connector half is constructed to be capable of mating with itself and thus to be hermaphroditic.

Figure 7:
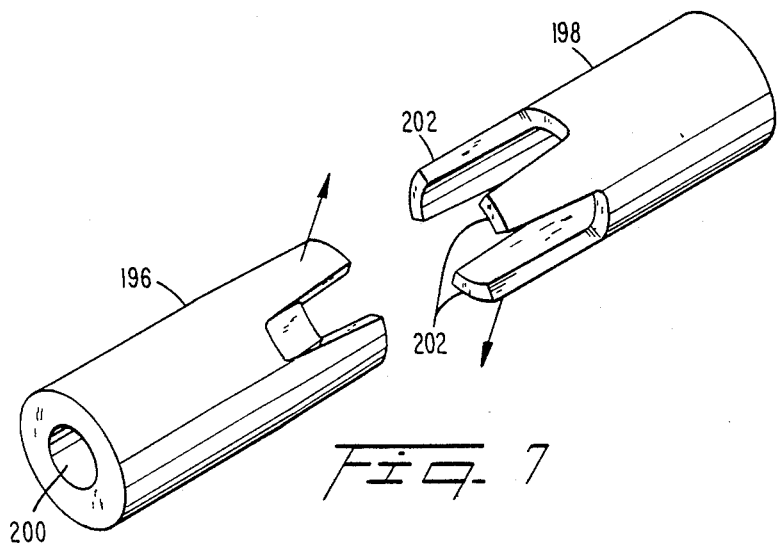
FIG. 7 is a perspective illustration of outer ceramic ferrules having a three tine hermaphroditic construction for aligning the polished ends of inner ferrules in registered fashion.

According to a preferred embodiment of the invention the optical fiber and its ferrule may be terminated at an optimized angle as illustrated in FIG. 6A and parallelism between the connected fibers and ferrules may be assured by the use of an inner hermaphroditic connection of the type illustrated in FIG. 7. Referring to FIG. 6A there is shown an optical fiber 184 precision centered in a ceramic ferrule 186. The end faces 188 of the fiber and ferrule are polished at an angle α which is greater than the sum of the Brewster Angle and the Numerical Aperture (NA) of the fiber to assure reflectionless transmission through the connection. The arrow 190 indicates that reflections from the polished fiber face are directed out of the fiber. As an additional means to minimize loss through the connector the face 192 of the connected ferrule and fiber assembly 194 is registered or disposed to assure that the two end face planes or faces 188 and 192 are parallel. This is accomplished according to the invention by utilizing internal hermaphroditic connectors of the type illustrated at 196 and 198 in FIG. 7. Referring to the internal connector half 198, this may be comprised of a ceramic (or other suitable material) ferrule having a central bore 200 (seen in ferrule 196) which receives ferrule 186 and its polished surface 188 in precision mounting therein. The nested ferrules 186 and 198 may be secured by any suitable means such as epoxy adhesive.

The internal ferrule 198 is provided with a terminating end cut to form three tines 202 with each tine of the same dimension as the space between the tines such that hermaphrodicity is achieved. The ferrule 196 is of the same construction. With this arrangement the ceramic ferrule holding the fiber must be disposed within the ferrule 198 such that the angular polished face 188 is directed towards either a tine or towards a space between two tines to allow hermaphroditic connection. In the preferred embodiment the angularly polished fiber end and ferrule surface 188 is directed towards the center of a tine such that the two connected fibers mounted in their respective ceramic ferrules have their polished end face planes 188 and 192 parallel as shown in FIG. 6A. It will be appreciated that the spacing between the parallel planes 188 and 192 in FIG. 6A is exaggerated and that in practice these planes are virtually if not actually abutting.

Referring to FIG. 10 hermaphroditic ferrules 196 and 198 may be disposed or mounted on ferrules such as ferrules 168 wherein the end face of the ferrule is polished to the preferred angle such as is illustrated in FIG. 6A. Other implementations of the inner hermaphroditic interface could use differing numbers of tines or other cut configurations without departing from the invention.

Whereas the embodiments of the invention described thus far have utilized fibers and ceramic ferrules polished to form planar surfaces intended for parallel substantially abutting disposition, other terminations may be utilized. Referring to FIG. 8A there is shown an embodiment of the invention wherein a spherical ball or lens 204 is used. The spherical lens 204 is received within the end 206 of a sleeve 208 mounted in the manner of the sleeve 120 in FIG. 5. The end 206 of the sleeve 208 is apertured at 210 and provided with a spherically cutaway inner seat 212 which mates with the spherical lens 204 and positions the same on the axis of the sleeve. The spherical lens 204 may be held in the seat 212 by any suitable means such as a washer 205 adhesively secured in position.

Referring to FIG. 8B there is shown an embodiment of the invention which is terminated in a rod or aspheric lens 214. In this embodiment the sleeve 216 is provided with a tubular end 218 with the lens 214 mounted in a bushing 220.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A connector for an optical fiber wherein said connector includes first ferrule means fitted on said optical fiber, said ferrul means and said optical fiber having coplanar end faces disposed at an acute angle to the axis of said optical fiber at its end, and second ferrule means having first and second opposed ends, said first ferrule means being mounted within said second ferrule means and disposed at a position wherein said coplanar end faces are between said opposed ends of said second ferrule means, said optical fiber extending from said first end of said second ferrule means, said second end of said second ferrule means having protruding portions separated by spaces between said protruding portions to form a hermaphroditic termination capable of mating with itself, said coplanar end faces being disposed within said second ferrule means in predetermined relationship to said hermaphroditic termination.

2. A connector according to claim 1 wherein said acute angle is greater than the sum of the Brewster Angle and the Numerical Aperture (NA) of the fiber.

3. A connector according to claim 1 wherein said hermaphroditic termination comprises an odd number of protruding portions separated by an equal number of spaces, said coplanar surfaces being disposed such that a line normal to said coplanar end surfaces which intersects the axis of said end of said optical fiber extends substantially through the center of either a protrusion or a space between said protrusions.

4. A connector according to claim 3 wherein said protrusions comprise tapered tines.

5. A connector according to claim 1 including a generally cylindrical connector body having first and second opposed ends; said second ferrule means being mounted within said connector body at a position such that said coplanar end faces are between said first and second opposed ends of said connector body and said optical fiber extends from said first end of said connector body, said second end of said connector body being shaped to mate with and connect to a connector carrying an optical fiber to permit transfer of energy between said optical fibers.

6. A connector according to claim 5 wherein said connector body includes closure means between said second end and said coplanar end surfaces, and closure actuating means within said connector body for moving said closure means from its position between said coplanar end surfaces and said second end when said connector body is matingly engaged with another connector body.

7. A connector according to claim 5 wherein said connector body has a second end shaped to form a hermaphroditic termination of a shape to mate with itself, said coplanar end surfaces being disposed within said connector body in predetermined relationship to said hermaphroditic termination.

8. A connector according to claim 7 wherein said acute angle is greater than the sum of the Brewster Angle and the Numerical Aperture (NA) of the fiber.

9. A connector for an optical fiber wherein said connector includes first ferrule means fitted on said optical fiber, said ferrule means and said optical fiber having coplanar end faces disposed at an angle to the axis of said optical fiber at its end, a generally cylindrical connector body having first and second opposed ends, said ferrule means being mounted within said connector body at a position such that said coplanar end faces are between said first and second opposed ends of said connector body and said optical fiber extends from the first end of said connector body, said second end of said connector body being shaped to mate with and connect to a connector carrying an optical fiber to permit transfer of energy between said optical fibers, closure means mounted within said connector body, said closure means having a closed position wherein at least a portion of said closure means lies between said coplanar end faces and said second end of said connector body and an open position wherein said portion of said closure means is removed from said position between said coplanar end faces and said second end of said connector body, and closure actuating means within said connector body for moving said closure means from said closed position to said open position when said connector body is matingly engaged with another connector body.

10. A connector according to claim 9 wherein said second end of said connector body is shaped to form a hermaphroditic termination of a shape to mate with itself.

11. A connector according to claim 9 wherein said closure means includes an elongated strip of flexible material having a first portion thereof extending diametrically across said connector body to form said portion of said closure means which lies between said coplanar end surfaces and said second end of said connector body in said closed position and having a second portion extending parallel to the axis of said connector body, said closure actuating means including reciprocatable means attached to said portion of said elongated strip extending parallel to the axis of said connector body, said reciprocatable means being mounted for movement within said connector body along an axis parallel to the axis of said connector body, movement of said reciprocatable means along its said axis causing the portion of said elongated strip extending parallel to the axis of said connector body to lengthen and the portion of said elongated strip extending perpendicular to the axis of said connector body to shorten to move said closure means to its open position.

12. A connector according to claim 9 including actuator engaging means mounted in said second end of said connector body at a position diametrically opposed to the position of said closure actuating means; said actuator engaging means being of such shape and dimension as to be mateable with said closure actuating means such that when two such connector bodies are matingly engaged said last named means causes said closure actuating means to move said elongated strip to its open position.

13. A connector according to claim 9 including aspherical lens means mounted within said connector body between said closure means and said coplanar end faces.

14. A connector according to claim 9 including spherical lens means mounted within said connector body between said closure means and said coplanar end faces.

15. A connector according to claim 11 wherein said reciprocatable means comprises an elongated member mounted within said connector body for slidable motion therein, spring means urging said elongated member towards said second end of said connector body; said elongated strip being connected to said elongated member at the portion of said elongated strip extending parallel to the axis of said connector body whereby movement of said elongated member along its axis moves said elongated strip therewith to move said closure means to its open position.

16. A connector according to claim 11 wherein said connector body includes sleeve means movably mounted therein coaxially around said ferrule means; said sleeve means having first and second opposed ends; said second end of said sleeve means being covered by said elongated strip in the unmated condition of said connector and moving through the plane of the diametrical extending portion of said elongated strip in the mating condition of said connector.

17. A counter according to claim 16 including lens means mounted in said sleeve means adjacent said second end thereof.

18. A connector according to claim 17 wherein said lens means comprises aspheric lens means.

19. A connector according to claim 17 wherein said lens comprises spherical lens means.

20. A connector according to claim 11 including guide means for said elongated strip, said guide means being mounted in said connector for reciprocating movement along the axis of said connector body, said guide means being shaped to define a track through which said elongated strip moves, said track including at least a portion extending normal to the axis of said connector body and at least a portion extending parallel to the axis of said connector body.

21. A connector according to claim 20 wherein said reciprocatable means is slidably received within said guide means for reciprocatable movement therethrough in a direction parallel to the axis of said connector body.

22. A connector according to claim 21 including pin means carried by said guide means and extending parallel to the axis of said connector body; said pin means being spaced from the axis of said connector body an equal distance to the spacing of the reciprocatable means from the axis of said connector body whereby said pin means is mateable with said reciprocatable means in another connector to reciprocate said reciprocatable means upon mating to cause said closure means to move to its open position.

* * * * *